(12) United States Patent
Kolodziejski et al.

(10) Patent No.: US 7,680,383 B1
(45) Date of Patent: Mar. 16, 2010

(54) SEMICONDUCTOR-BASED BROADBAND MODULATORS

(75) Inventors: Leslie A. Kolodziejski, Belmont, MA (US); Gale S. Petrich, Arlington, MA (US); Orit Shamir, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/198,307

(22) Filed: Aug. 26, 2008

(51) Int. Cl.
*G02B 6/10* (2006.01)
*H01L 21/00* (2006.01)

(52) U.S. Cl. .............. 385/132; 385/1; 385/2; 385/11; 385/37; 385/129; 385/130; 385/131; 438/29; 438/31; 438/32

(58) Field of Classification Search .......... 385/1, 385/2, 3, 14, 129, 130, 131, 132, 141, 11, 385/27, 28, 37; 438/29, 32, 31
See application file for complete search history.

(56) References Cited

U.S. PATENT DOCUMENTS 6,959,123 B2 * 10/2005 Painter et al. ............ 385/1
2005/0135721 A1 * 6/2005 Painter et al. ............ 385/1

* cited by examiner

*Primary Examiner*—Brian M Healy
(74) *Attorney, Agent, or Firm*—Gauthier & Connors LLP

(57) ABSTRACT

An optical modulator is provided. The optical modulator includes a ridge-shaped active region comprising a plurality of alternating high and low index layers. The ridge-shaped active region is used to confine a selective optical mode for optical modulation. A plurality of oxidized layers positioned so as to confine the selective optical mode in the middle region of the ridge-shaped active region. The oxidized layers enable the optical modulator to withstand high operating voltages both in reverse and forward bias without concern of breakdown or carrier loss.

15 Claims, 10 Drawing Sheets

| Material | Index at 800nm |
|---|---|
| GaAs | 3.64 |
| $Al_{0.8}Ga_{0.2}As$ | 3.14 |
| $In_{0.53}Ga_{0.47}P$ | 3.32 |
| InAlP | 2.99 |
| AlAs | 2.96 |
| $Al_xO_y$ | 1.60 |

| Device Length (mm) | 3.0 | 4.5 | 6.0 | 7.5 | 9.0 | 10.5 |
|---|---|---|---|---|---|---|
| MOS Device Voltage (V) | 3.75 | 2.50 | 1.88 | 1.50 | 1.25 | 1.07 |
| Deep Device Voltage (V) | 6.84 | 4.56 | 3.42 | 2.74 | 2.28 | 1.96 |

| Material | Index at 800nm |
|---|---|
| GaAs | 3.64 |
| $Al_{0.26}Ga_{0.74}As$ | 3.51 |
| $Al_{0.18}Ga_{0.82}P$ | 3.58 |
| AlAs | 2.96 |
| $Al_xO_y$ | 1.60 |

(a) An arrayed waveguide grating based on the $Al_{0.26}Ga_{0.74}As/Al_{0.18}Ga_{0.82}As$ MOS-based structure.

| | |
|---|---|
| Central wavelength (nm) | 799.8 |
| Modal index (I/O waveguides) | 3.507 |
| Modal index (array waveguides) | 3.513 |
| Phasar order | 1979 |
| Dispersion (μm/GHz) | 0.40 |
| Free spectral range (nm) | 0.40 |
| Channel spacing (GHz) | 9.99 |
| Channel spacing (nm) | 0.021 |
| Diffraction loss of central channel (dB) | 2.20 |

FIG. 10

SEMICONDUCTOR-BASED BROADBAND MODULATORS

This invention was made with government support awarded by the Defense Advanced Research Projects Agency (DARPA) under Contract No. HR0011-05-C-0155. The government has certain rights in the invention.

BACKGROUND OF THE INVENTION

The invention is related to the field of optical modulation, and in particular to an optical modulator structure having novel heterostructures that exhibit more efficient mode confinement using new material designs.

Optical signal modulation is a cornerstone of communication, allowing the transfer of information by electrically encoding data onto an optical carrier. Modulation with ultra-broadband capability enables the generation of arbitrary waveforms using the electro-optic effect. By separating an incoming pulsed optical source into a frequency comb through the use of arrayed waveguide gratings, and employing both phase and amplitude modulation using Mach Zehnder Interferometers, an arbitrary waveform is constructed following frequency channel recombination.

The invention provides heterostructures that aid in the development of more efficient optical modulator structures using better material designs and integrating modulator structures with other optical components, such as arrayed waveguide gratings and electrical components.

SUMMARY OF THE INVENTION

According to one aspect of the invention, there is provided an optical modulator. The optical modulator includes a ridge-shaped active region comprising a plurality of alternating high and low index layers. The ridge-shaped active region is used to confine a selective optical mode for optical modulation. A plurality of oxidized layers positioned so as to confine the selective optical mode in the middle region of the ridge-shaped active region. The oxidized layers enable the optical modulator to withstand high operating voltages both in reverse and forward bias without concern of breakdown or carrier loss.

According to another aspect of the invention, there is provided a method of forming an optical modulator. The method includes forming a ridge-shaped active region comprising a plurality of alternating high and low index layers. The ridge-shaped active region is used to confine a selective optical mode for optical modulation. Also, the method includes forming a plurality of oxidized layers positioned so as to confine the selective optical mode in the middle region of the ridge-shaped active region. The oxidized layers enable the optical modulator to withstand high operating voltages both in reverse and forward bias without concern of breakdown or carrier loss.

According to another aspect of the invention, there is provided an arrayed waveguide grating structure. The arrayed waveguide grating structure includes a plurality of phased array of waveguides positioned between two free propagation regions. Each of the phased array of waveguides includes a ridge-shaped active region comprising a plurality of alternating high and low index layers. The ridge-shaped active region is used to confine a selective optical mode for optical modulation. A plurality of oxidized layers positioned so as to confine the selective optical mode in the middle region of the ridge-shaped active region. The oxidized layers enable the optical modulator to withstand high operating voltages both in reverse and forward bias without concern of breakdown or carrier loss.

BRIEF DESCRIPTION OF THE DRAWINGS

FIG. 10 is a table listing the parameters of an AWG formed in accordance with the invention.

DETAILED DESCRIPTION OF THE INVENTION

The invention provides novel heterostructures for making broadband modulators that exhibit better mode confinement and signal demultiplexers based on new material designs presented herein. When combined, the modulators and demultiplexer devices construct a system capable of generating ultra broadband arbitrary optical waveforms.

Low-loss devices demand a high degree of mode confinement. The deep-etched arsenide-based structure, an improvement over the shallow-etched device limits the mode movement and expansion laterally but not the vertically. Uncontained, the mode can couple to the substrate or approach the metal contacts and suffer optical loss.

Figures 1, 2:
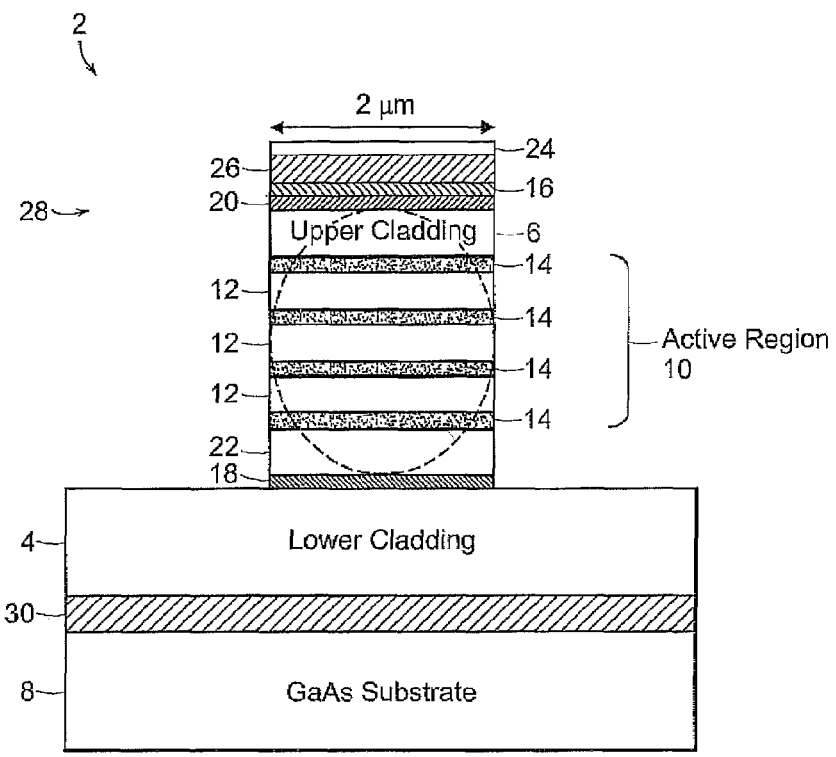
FIG. 1 is a schematic diagram of the inventive modulator heterostructure formed in accordance with the invention.
FIG. 2 is a table illustrating the indices of the materials used in forming the modulator heterostructure of FIG. 1.

FIG. 1 shows the inventive modulator structure 2. The modulator structure 2 includes a thick lower cladding layer 4 having a thickness of 1350 nm. An active region 10 includes an upper $Al_{0.8}Ga_{0.2}As$ cladding layer 6 having a thickness of 400 nm. Both the lower cladding layer 4 and upper cladding layer 6 isolate the mode from the GaAs substrate 8 and Si-doped $Al_{0.8}Ga_{0.2}As$ layer 30 and electrical contacts respectively. Also, the active region 10 includes a dilute core composed of repeating 200 nm thick, low-index $Al_{0.8}Ga_{0.2}As$ layers 12 and 15 mm thick, high-index $In_{0.53}Ga_{0.47}P$ layers 14 and an $Al_{0.8}Ga_{0.2}As$ layer 22 having a thickness of 400 nm. The resultant active region 10 has an index of refraction only slightly higher than its surroundings, leading to a reduction in coupling loss, but provides sufficient mode confinement. Additionally, the a Si-doped GaAs layer 24 having a thickness a 30 nm and an $Al_{0.8}Ga_{0.2}As$ layer 26 having a thickness of 100 nm provide a lower bandgap to aid in making contact to evaporated metal layers. The refractive indices of materials used in the heterostructure are provided in the table shown in FIG. 2.

Two AlAs layers and an $In_{0.49}Al_{0.51}P$ layer 20 have been added to the heterostructure. The AlAs layers can be thermally oxidized to form $Al_xO_y$ layers 16, 18 having thicknesses of 40 nm, as shown in FIG. 1, to strongly confine the optical mode in the middle of the structure 2. The oxidized layers 16, 18 also enable the modulator to withstand higher operating voltages both in reverse and forward bias without concern of breakdown or carrier loss. Consequently, the device is essentially unipolar and can be powered in a push-pull manner, which reduces the required Mach Zehnder arm length. The $In_{0.49}Al_{0.51}P$ layer serves as an etch stop in fabrication. Selectivity between AlAs and $Al_{0.8}Ga_{0.2}As$ during RIE is poor, and an etch stop is necessary to prevent overetching. The mask set developed for the reverse-biased, shallow and deep-etched structures accommodates this heterostructure design as well.

After formation of the active region 10 and the layers 16, 18, 20, 24, and 26, a 2 µm wide ridge structure 28 is formed by etching away of these layers. The lower cladding 4, a 150 nm thick Si doped $Al_{0.8}Ga_{0.2}As$ layer 30 and the GaAs substrate 8 are not etched. The modulator structure is formed by creating passive waveguides, or ridges, that lead into and out of the active Mach Zehnder arms (also ridges) that are later covered with evaporated metal. The passive ridges have no metal over them. There are two semiconductor reactive ion etch steps—the first one removes the top Si-doped layers over regions where the passive waveguide ridges will be, and the second defines the all devices (y-splitters, MMIs, Mach Zehnder arms and passive waveguides) using an oxide mask by etching away all layers down to and including the lower AlAs layer.

The modulator fabrication process remains identical with those modulators in the art except the added oxidation step after the second semiconductor etch and prior to BCB planarization, the AlAs must be exposed by a semiconductor RIE step for oxidation to occur.

Figure 3A:
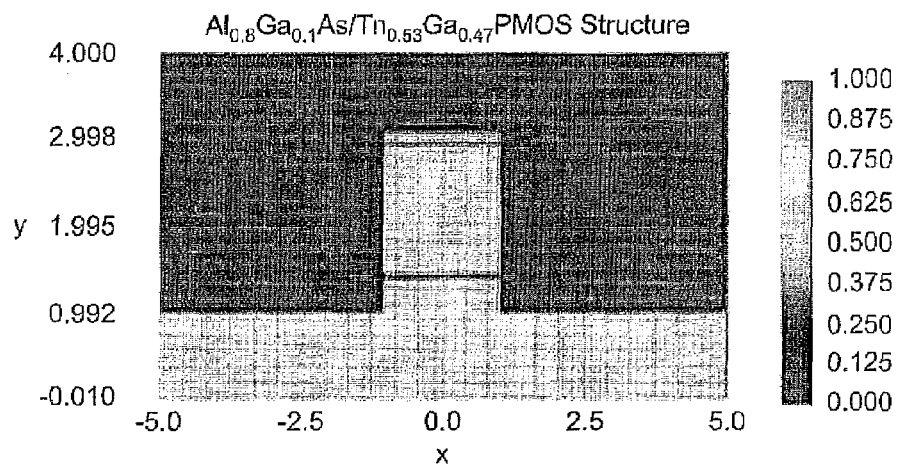
FIGS. 3A-3C are the TE and TM mode profiles and associated indices for the MOS-based structure.
Figure 3B:
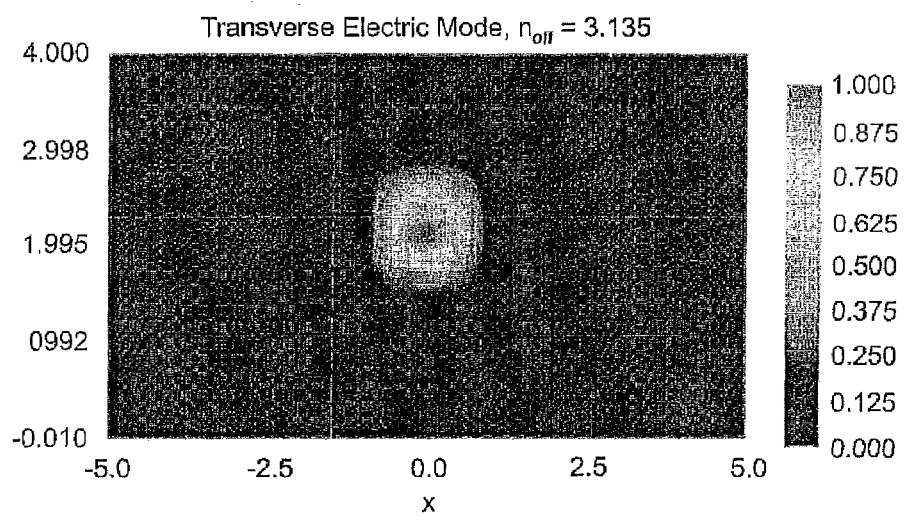
Figures 3C, 4:
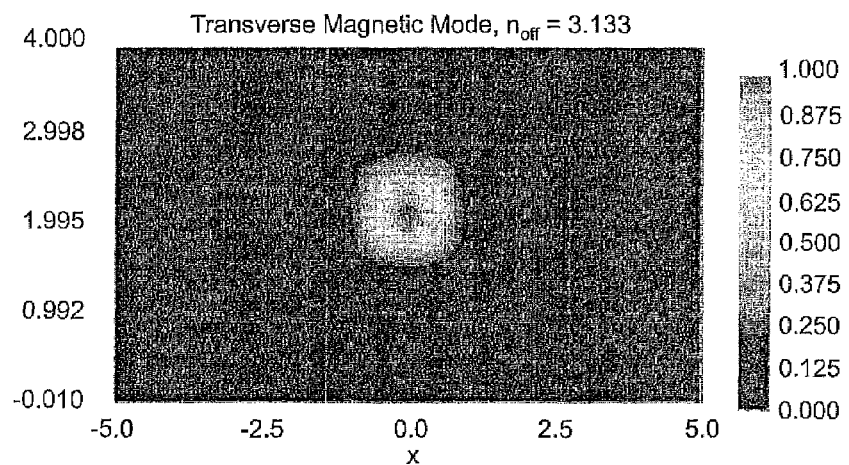
FIG. 4 is a table illustrating $V_\pi$ values associated with the modulator heterostructure formed in accordance with the invention.

FIGS. 3A-3C shows the TE and TM mode profiles and associated indices for the MOS-based structure. Both modes are approximately 1.75 µm×1.3 µm (W×H) in size. Though the new heterostructure 2 does not offer increased lateral confinement of the mode over the reverse-biased deep-etched device (the 2 µm ridge width is identical), it provides superior vertical confinement by comparison to the 1.78 µm×2.4 µm (W×H) mode dimensions of the deep-etched structure without the confining $Al_xO_y$ layers.

The natural birefringence in this structure is estimated to be $1.65 \cdot 10^{-3}$ at 800 nm, approximately equal to the birefringence of previously discussed structures. The values are similar as the overall layer configuration and material choices are nearly identical.

The voltage required to achieve a phase shift of $V_\pi$ was calculated using known techniques in the art. The calculated $V_\pi$ values presented in FIG. 4 are computed for the TE mode with an effective refractive index of 3.13, modulator lengths ranging from 3 mm to 10.5 mm, a ridge height of 1.3 µm, (equivalent to the mode height), and for the operational wavelength of 800 nm. The values of the corresponding deep-etched structure (without the confining $Al_xO_y$ layers) calculations are also provided for comparison. A MOS device requires approximately half the voltage of the deep-etched structure to achieve a phase shift that is needed. The noteworthy decrease in $V_\pi$ is attributed mainly to better mode confinement, which reduces the value of $t_g$, the height of the modulator active region.

Figures 5, 6:
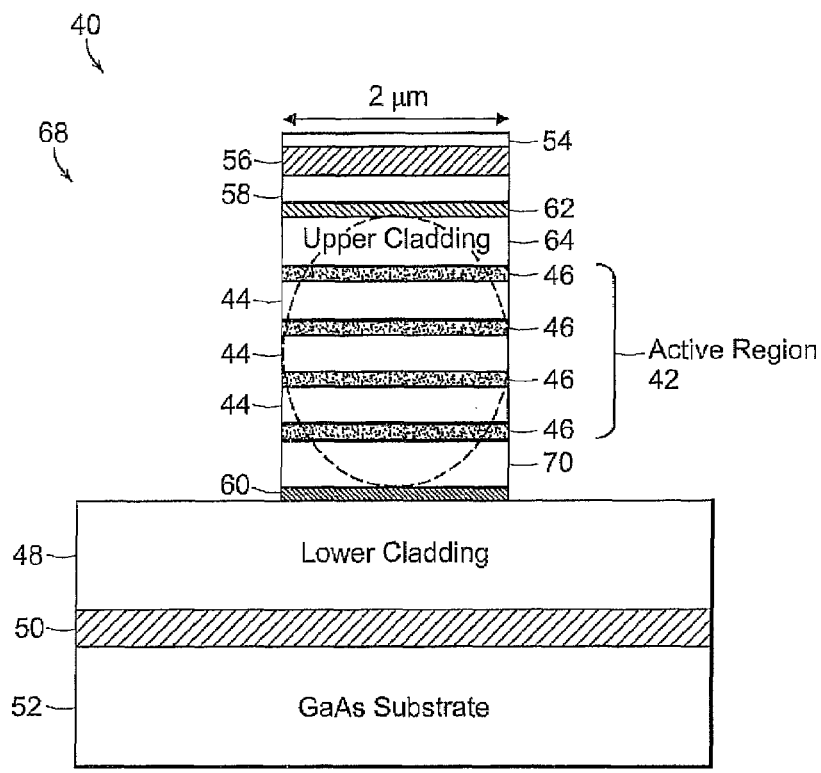
FIG. 5 is a schematic diagram illustrating an inventive MOS-based, $Al_{0.26}Ga_{0.74}As/Al_{0.18}Ga_{0.82}As$ heterostructure with a 2 µm ridge formed in accordance with the invention.
FIG. 6 is table illustrating the indices of the materials used to form the $Al_{0.26}Ga_{0.74}AS/Al_{0.18}Ga_{0.82}As$ heterostructure of FIG. 5.

An additional MOS-based modulator design 40, with an active region 42 composed entirely of AlGaAs layers of various degrees of Al content, is illustrated in FIG. 5. The dilute core or active region 42 includes repeating low index $Al_{0.26}Ga_{0.74}As$ layers 44 having a thickness of 175 nm each, high index $Al_{0.18}Ga_{0.82}As$ layers 46 having a thickness of 60 nm each, and an $Al_{0.26}Ga_{0.74}As$ layer 70 having a thickness of 350 nm. The active region 42 includes an upper $Al_{0.26}Ga_{0.74}As$ cladding layer 64 having a thickness of 350 nm. The modulator structure 40 includes a thick lower $Al_{0.26}Ga_{0.74}As$ cladding layer 48 having a thickness of 2000 nm. Both the upper and lower claddings 64, 48 isolate the mode from the GaAs substrate 52 and Si-doped layer 50 and electrical contacts respectively. The resultant active region 42 has an index of refraction only slightly higher than its surroundings, leading to a reduction in coupling loss, but provides sufficient mode confinement. Additionally, the a Si-doped GaAs layer 54 having a thickness a 20 nm and a Si doped $Al_{0.26}Ga_{0.74}As$ layer 56 having a thickness of 175 nm provide a lower bandgap to aid in making contact to evaporated metal layers. The refractive indices of materials used in the heterostructure are provided in the table shown in FIG. 6.

Two AlAs layers can be thermally oxidized to form $Al_xO_y$ layers 60, 62 having thicknesses of 40 nm each, as shown in FIG. 5, to strongly confine the optical mode in the middle of the structure 40. The oxidized layers 60, 62 also enable the modulator 40 to withstand higher operating voltages both in reverse and forward bias without concern of breakdown or carrier loss. An $Al_{0.26}Ga_{0.74}As$ layer 58 is positioned between the layers 56 and the oxide layer 62.

After formation of the active region 42 and the layers 54, 56, 58, 60, 62, 64 and 70, a 2 µm wide ridge structure 68 is formed by etching away of these layers. The lower cladding 48, a 175 nm thick Si doped $Al_{0.26}Ga_{0.74}As$ layer 50, and the GaAs substrate 52 are not etched. The modulator structure is formed by creating passive waveguides, or ridges (as seen in structure 120), that lead into and out of the active Mach Zehnder arms (also ridges) that are later covered with evaporated metal. The passive ridges have no metal over them. There are two semiconductor reactive ion etch steps—the first one removes the top Si-doped layers over regions where the passive waveguide ridges will be, and the second defines the all devices (y-splitters, MMIs, Mach Zehnder arms and passive waveguides) using an oxide mask by etching away all layers down to and including the lower AlAs layer. The layer 58 was made intentionally thick—it is essential to remove the doped layers over passive areas during the first etch but not process into the active region. Therefore, a thick layer 58 ensures that the active region layers are not removed during the first etch.

The invention allows varying Al content for the various AlGaAs layers as well as varying layer thicknesses described herein without deviating from the scope of the invention.

Though the modulation bandwidth is reduced from 650 nm<λ<950 nm heterostructure 2 to 750 nm<λ<850 nm heterostructure 40, the bandwidth remains large and more than sufficient for the purpose of the invention.

Growth of low Al content AlGaAs layers by MBE is easier than the deposition of a combination of high Al content AlGaAs and InGaP layers. Furthermore, the near-uniform material composition of the active region eases the RIE process, which etches $Al_{0.8}Ga_{0.2}As$ and $In_{0.53}Ga_{0.47}P$ at different rates and often with different chemistries. As with previously known MOS structures, oxidized AlAs layers confine the vertical movement of the optical mode. However, no InAlP etch stop layer is necessary as the top cladding layer was increased in thickness. The 2.175 µm lower cladding layer was made considerably thicker than in previous designs as an additional precaution, preventing the mode from coupling to the substrate.

Figure 7A:
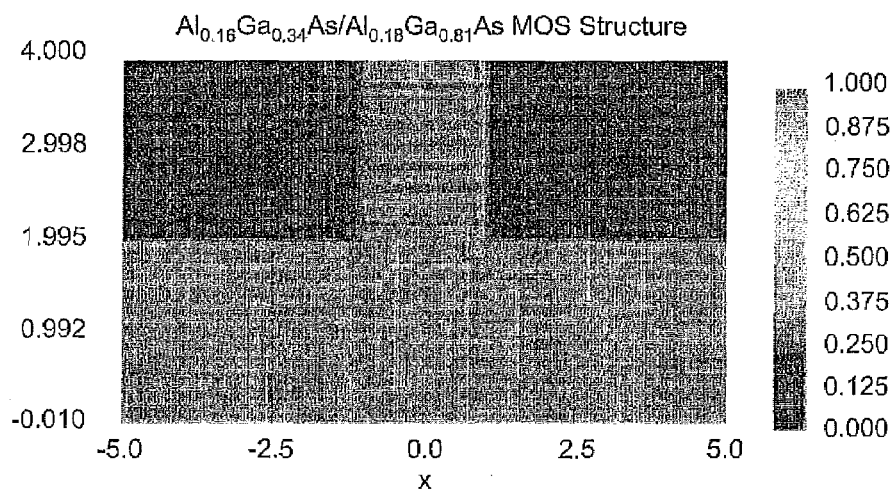
FIG. 7A are mode simulations for the $Al_{0.26}Ga_{0.74}As/Al_{0.18}Ga_{0.82}As$ heterostructure of FIG. 5.
Figure 7B:
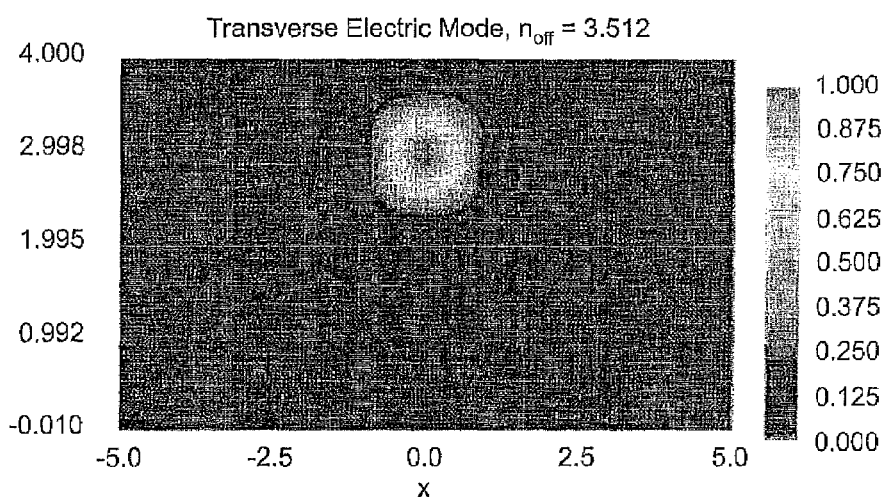
FIG. 7B is the computed TE mode profile of the $Al_{0.26}Ga_{0.74}As/Al_{0.18}Ga_{0.82}As$ heterostructure.

FIGS. 7A-7B show the TE and TM mode profiles and associated indices for the all AlGaAs MOS-based structure. Both modes are approximately 1.75 μm×1.25 μm (W×H) in size. The mode confinement capability of the device is only a slight improvement over the previous MOS design (1.75 μm×1.3 μm), but prevails over the reverse-biased shallow-etched and deep-etched structure.

The natural birefringence in this structure is estimated to be $7.9 \times 10^{-4}$ at 800 nm. The similar high and low index materials allow the mode to feel a near-uniform surrounding; reducing the birefringence.

The voltage required to achieve a phase shift of $\pi$ was calculated using the known techniques in the art. The calculated $V_\pi$ are computed for a TE mode with an effective index of 3.51, modulator lengths ranging from 3 mm to 10.5 mm, a ridge height of 1.25 μm (equivalent to the mode height), and for the operational wavelength of 800 nm. The lower required voltage is attributed to increased mode confinement and the heterostructure's higher index of refraction ($n^3$ is inversely proportional to $V_\pi$).

Arbitrary waveform generation is obtained by the phase and amplitude modulation of frequency comb components. Hence, optical wavelength demultiplexers and multiplexers are necessary for spatial separation and recombination of wavelength components prior to and following modulation. An N×N arrayed waveguide grating (AWG) with N input and output waveguides is bi-directional, and serves as both a demultiplexer and multiplexer.

Figure 8A:
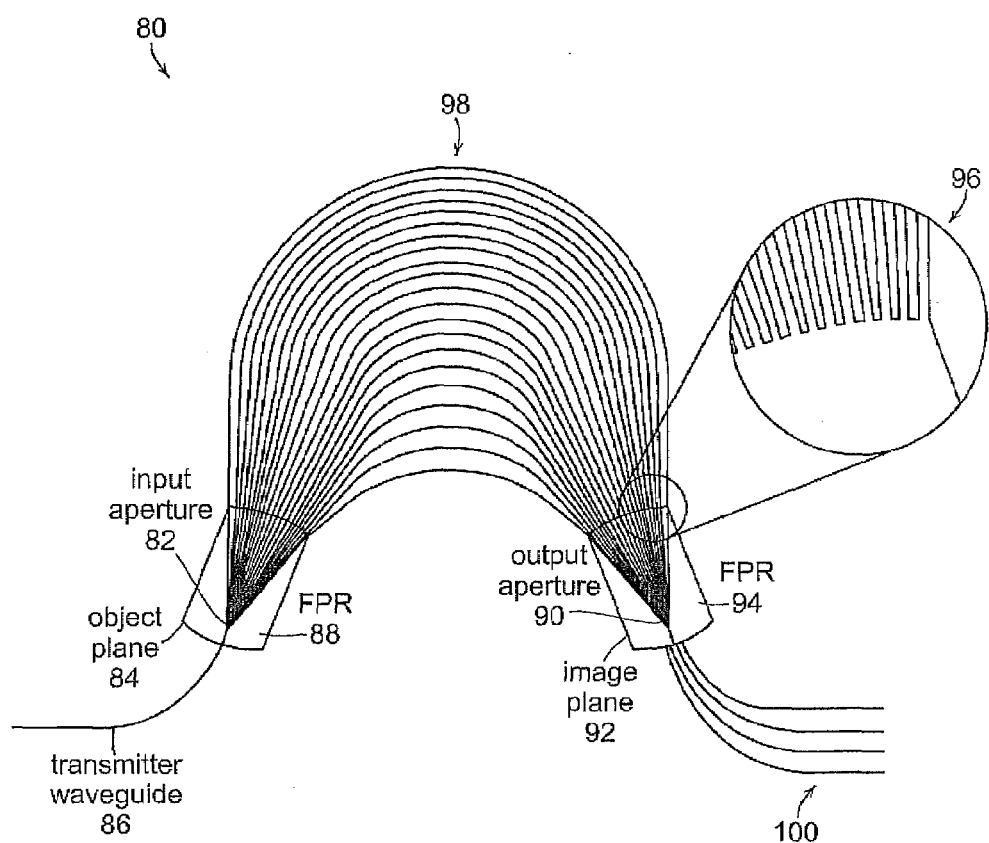
FIG. 8A is a schematic diagram of arrayed waveguide grating (AWG) structure formed in accordance of the invention.

A schematic of an AWG 80 formed in accordance with the invention is shown in FIG. 8A. The AWG 80 includes a phased array of waveguides 98 positioned between two free propagation regions, or FPRs 88, 94. An incoming beam propagates through a single-mode input waveguide or transmitter waveguide 86 and enters the free propagation region 88 where it is laterally unconfined thru image plane 84. The beam is coupled into the single-mode waveguide array at the input aperture 82 and travels through the waveguide until reaching the output aperture 90, where another FPR 94 is situated. As the optical signal moves through the FPR 94, light that was diffracted from waveguides in the phased array section 96 constructively interferes and focuses at the image plane 92 where it is captured by strategically-placed output waveguides 100, each of which carries a distinct wavelength.

Figure 8B:
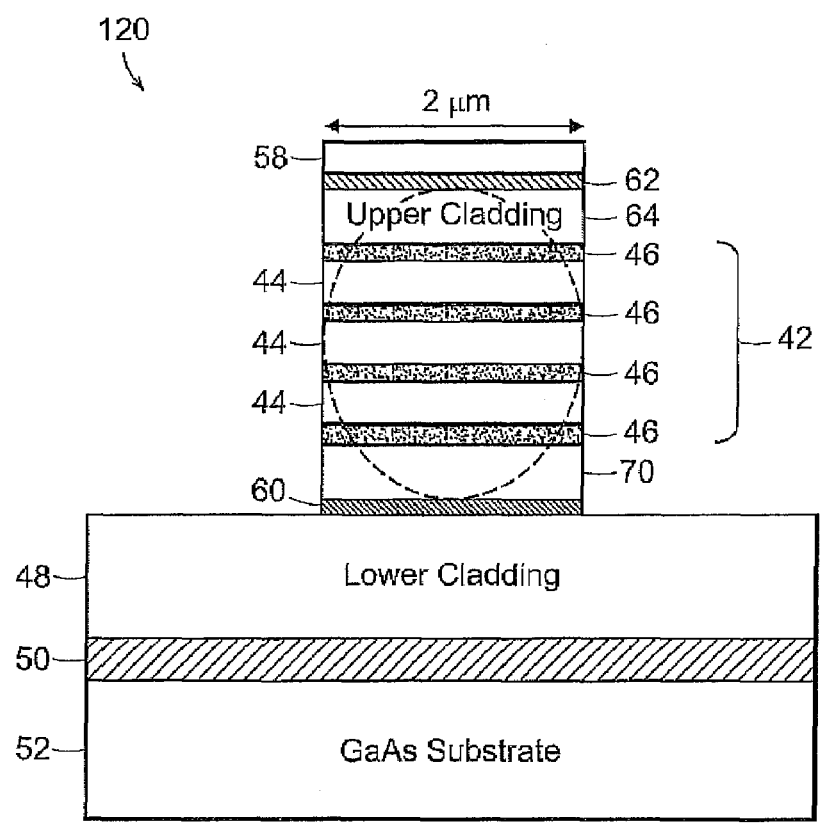
FIG. 8B is schematic cross-section of the one of the phased array waveguides of the AWG of FIG. 8A.

FIG. 8B shows the cross-section of one 120 of the phased array of waveguides 98 used to form the AWG 80 in accordance with the invention. The phase array waveguide 120 includes a similar structural arrangement as the modulator structure 40 described for FIG. 5. The only exception is the Si-doped GaAs layer 54 and a Si doped $Al_{0.26}Ga_{0.74}As$ layer 56 are removed because of the lack for metal contacts. Also, the modulator structure 2 of FIG. 1 can also be used to form a phased array waveguide for an AWG as well.

A waveguide in the phased array section is longer than its neighbor by a length, $\Delta L$, defined as $$\Delta L = m \frac{\lambda_c}{n_{eff}} \quad (1)$$

where m is an integer representing the array order, $\lambda_c$ is the central wavelength of the device and $n_{eff}$ describes the effective index of refraction of the waveguide. Light at the central frequency displays unaltered phase and a consistent field distribution at the output aperture, and is focused at the center of the image plane. The length adjustment creates a phase distribution (that varies linearly at the output aperture) over other frequencies in the waveguide array, tilting the beam and moving the focal point along the image plane to corresponding frequency channel output waveguides. As a result, the device output is extremely sensitive to phase variance, and miscalculation or fabrication errors can result in unsuccessful frequency channel separation.

The phase difference, $\Delta\Phi$ between neighboring waveguides is determined by $$\Delta\Phi = \beta\Delta L \quad (2)$$

for $\beta$ the waveguide propagation constant. The movement of the focal point along the image plane is periodic and repeats for every phase shift of $2\pi$. The frequency shift that accommodates $\Delta\Phi=2\pi$ is referred to as the free spectral range, or $\Delta f_{FSR}$, computed by $$\Delta f_{FSR} = \frac{c}{\tilde{N}_g \Delta L} \quad (3)$$

where c is the speed of light. $\tilde{N}_g$ is the group index of the waveguide mode and varies with frequency, f·$\tilde{N}_g$ is calculated by $$\tilde{N}_g = N_g + f \frac{dN_g}{df} \quad (4)$$

Figure 9A:
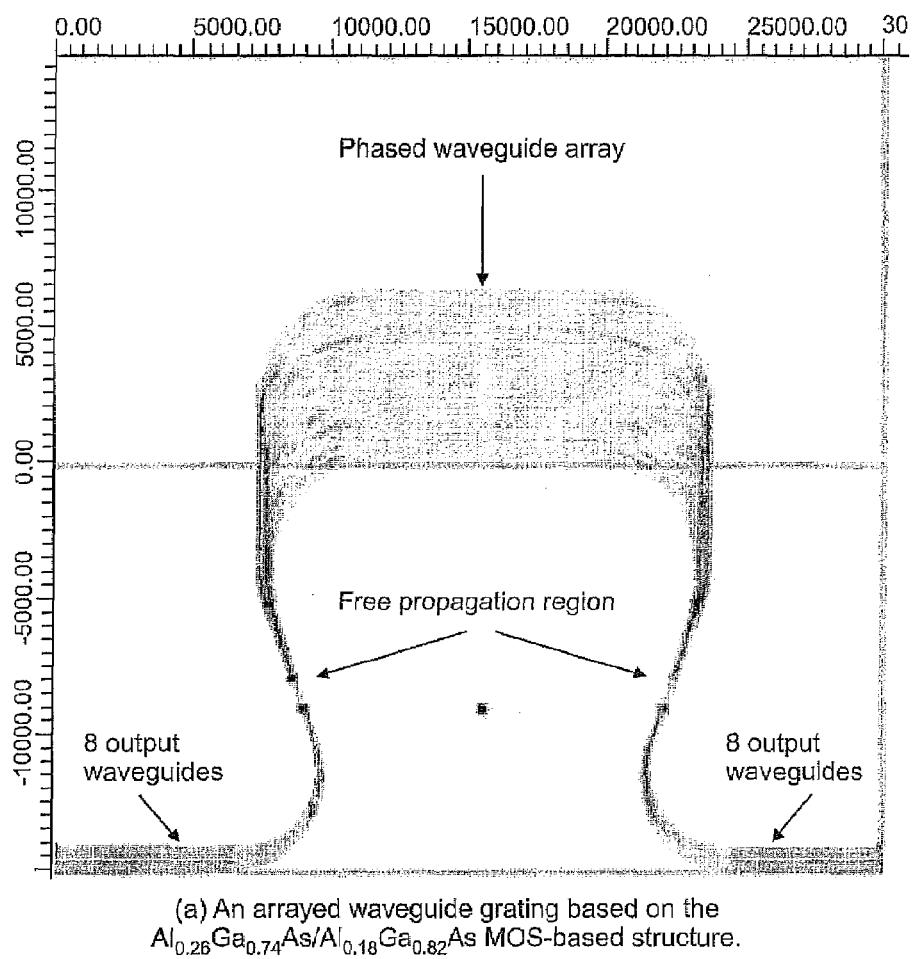
FIGS. 9A-9B are layout design and simulation of an arrayed waveguide grating structure formed in accordance with the invention.

An Optiwave WDM Phasar simulation program was employed in the design of an arrayed waveguide grating. The AWG, displayed in FIG. 9A, employs the all AlGaAs MOS-based structure and makes use of the superior mode confinement capability of the heterostructure. The device has eight input and output waveguides that are 2 μm wide it is of course possible to model AWGs that have many more inputs and outputs. As the input aperture of the free propagation region is approached, the waveguide width gradually increases to 3 μm over a length of 50 μm. The output waveguides taper in width at the output aperture, scaling back from 3 μm to 2 μm over a similar length. The tapering, and inversely the increase in waveguide width, allows the optical mode to smoothly transition from the confined waveguides to the dispersive free propagation region. The thirty waveguides in the phased array section similarly taper from a width of 4 μm to 3 μm. At the first FPR output, where the waveguides are 4 μm wide, there is no space between the waveguides, encouraging full transmission of the diffracted power from the first FPR to the phased array waveguides and on to the second FPR. The specifications of the AWG are provided in table of FIG. 10.

Figure 9B:
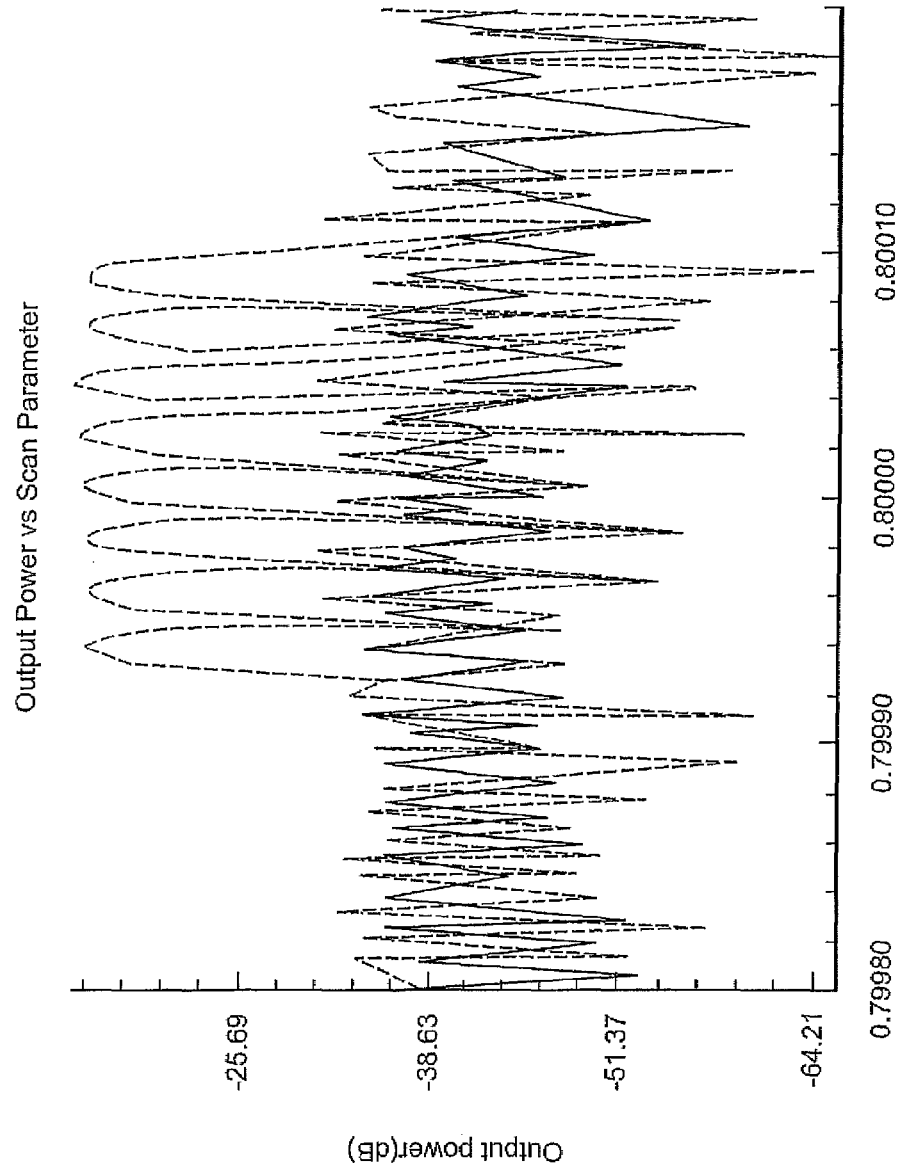

The simulation results of the designed arrayed waveguide gratings device, provided in FIG. 9B, display the AWG output power (dB) of each wavelength channel as seen from the 4th output port. The distinct wavelength channels, identified by different colors in the figure, are spatially separated and exhibit an output power of over 23 dB and channel crosstalk around −30 to −40 dB.

The invention provides novel heterostructures used in the formation of various optical components, such as modulator structures and AWGs. The optical components can be incorporated to form various optical systems without unduly limiting the performance of these systems.

Although the present invention has been shown and described with respect to several preferred embodiments thereof, various changes, omissions and additions to the form and detail thereof, may be made therein, without departing from the spirit and scope of the invention

What is claimed is:

1. An optical modulator comprising:
   a ridge-shaped active region comprising a plurality of alternating high and low index layers along with a plurality of similar lateral material construction and one or more cladding elements, said ridge-shaped active region is used to confine a selective optical mode for optical modulation; and
   a plurality of oxidized layers positioned above and below said ridge-shaped active region and plurality of similar index materials laterally constructed so as to confine the selective optical mode in the middle region of said ridge-shaped active region, said oxidized layers enable the optical modulator to withstand high operating voltages both in reverse and forward bias without concern of breakdown or carrier loss and said similarities in vertical and lateral construction enable minimization in polarization dispersion.

2. The optical modulator of claim 1, wherein said oxidized layers comprise $Al_xO_y$ layers.

3. The optical modulator of claim 1, wherein said substrate comprises GaAs.

4. The optical modulator of claim 3 further comprising a semiconductor layer positioned on said substrate.

5. The optical modulator of claim 1 further comprising a doped semiconductor layer providing a lower bandgap to aid in making contact to evaporated metal layers.

6. The optical modulator of claim 4, wherein the one or more cladding elements comprise a lower cladding layer positioned above said semiconductor layer.

7. The optical modulator of claim 6, wherein the one or more cladding elements comprise an upper cladding positioned on the ridge-shaped active region.

8. A method of forming an optical modulator comprising:
   forming a ridge-shaped active region comprising a plurality of alternating high and low index layers along with a plurality of similar lateral material construction and one or more cladding elements, said ridge-shaped active region is used to confine a selective optical mode for optical modulation; and
   forming a plurality of oxidized layers positioned above and below said ridge-shaped active region and plurality of similar index materials laterally constructed so as to confine the selective optical mode in the middle region of said ridge-shaped active region, said oxidized layers enable the optical modulator to withstand high operating voltages both in reverse and forward bias without concern of breakdown or carrier loss and said similarities in vertical and lateral construction enable minimization in polarization dispersion.

9. The method of claim 8, wherein said oxidized layers comprise $Al_xO_y$ layers.

10. The method of claim 8, wherein said substrate comprises GaAs.

11. The method of claim 10 further comprising a semiconductor layer positioned on said substrate.

12. The method of claim 8 further comprising a doped semiconductor layer providing a lower bandgap to aid in making contact to evaporated metal layers.

13. The method of claim 11, wherein the one or more cladding elements comprise a lower cladding layer positioned above said semiconductor layer.

14. The method of claim 13, wherein the one or more cladding elements comprise an upper cladding positioned on the ridge-shaped active region.

15. An arrayed waveguide grating structure comprising:
   a plurality of phased array of waveguides positioned between two free propagation regions, each of said phased array of waveguides comprising:
   a ridge-shaped active region comprising a plurality of alternating high and low index layers along with a plurality of similar lateral material construction and one or more cladding elements, said ridge-shaped active region is used to confine a selective optical mode for optical; and
   a plurality of oxidized layers positioned above and below said ridge-shaped active region and plurality of similar index materials laterally constructed so as to confine the selective optical mode in the middle region of said ridge-shaped active region, said oxidized layers enable the optical modulator to withstand high operating voltages both in reverse and forward bias without concern of breakdown or carrier loss.

* * * * *